United States Patent
Kotake

(10) Patent No.: US 8,610,905 B2
(45) Date of Patent: Dec. 17, 2013

(54) IMAGE FORMATION SYSTEM LOCK RELEASE

(75) Inventor: Kanako Kotake, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1495 days.

(21) Appl. No.: 11/896,168

(22) Filed: Aug. 30, 2007

(65) Prior Publication Data
US 2008/0055647 A1 Mar. 6, 2008

(30) Foreign Application Priority Data
Aug. 31, 2006 (JP) ................................ 2006-235714

(51) Int. Cl.
*H04N 1/60* (2006.01)
*G06F 3/12* (2006.01)
*G06F 15/00* (2006.01)
*G06K 1/00* (2006.01)

(52) U.S. Cl.
USPC ........................... 358/1.13; 358/1.15; 358/1.9

(58) Field of Classification Search
None
See application file for complete search history.

(56) References Cited

U.S. PATENT DOCUMENTS

| 7,058,332 B2 | 6/2006 | Moroi | |
|---|---|---|---|
| 2001/0013944 A1* | 8/2001 | Nagasawa et al. | 358/1.14 |
| 2002/0194140 A1* | 12/2002 | Makuck | 705/67 |
| 2003/0061166 A1* | 3/2003 | Saito et al. | 705/54 |
| 2005/0141008 A1* | 6/2005 | Billow et al. | 358/1.13 |
| 2006/0215202 A1* | 9/2006 | Nakata et al. | 358/1.13 |
| 2007/0079374 A1* | 4/2007 | Yasui et al. | 726/22 |

FOREIGN PATENT DOCUMENTS

| JP | 2004- 171494 | 6/2004 |
|---|---|---|
| JP | 2004-192219 | 7/2004 |
| JP | 2004-249722 | 9/2004 |
| JP | 2005-149219 A2 | 6/2005 |
| JP | 2005-157479 A2 | 6/2005 |
| JP | 2005-301613 | 10/2005 |
| JP | 2005-326964 A2 | 11/2005 |

OTHER PUBLICATIONS

Japanese Office Action, with English Translation, issued in Japanese Patent Application No. JP 2006-235714 dated on Jul. 1, 2008.

* cited by examiner

*Primary Examiner* — Ming Hon
(74) *Attorney, Agent, or Firm* — Banner & Witcoff, Ltd.

(57) ABSTRACT

An image formation system, which is provided with a first storage configured to store initial setting containing information, includes at least one setting item, necessary for an image formation, a second storage configured to store a lock setting which locks modification of the at least one setting item of the initial setting, an acquiring system configured to acquire release of the lock setting when a file subject to the image formation is selected, an image formation device configured to form an image on a printing sheet, the image formation device forming the image in accordance with the initial setting stored in the first storage and the at least one setting item of which the release of the lock setting is acquired by the acquiring system and modification is made, and a re-setting system configured to invalidate the modification of the at least one setting item and validate the lock setting.

18 Claims, 14 Drawing Sheets

IMAGE FORMATION SYSTEM LOCK RELEASE

CROSS-REFERENCE TO RELATED APPLICATIONS

This application claims priority from Japanese Patent Application No. 2006-235714, filed on Aug. 31, 2006, the entire subject matter of which is incorporated herein by reference.

BACKGROUND

1. Technical Field

The present invention relates to an image formation system configured to form images on printing sheets or the like, and also relates to a method therefor and a computer program which causes the computer, when executed thereby, to function as the image formation system.

2. Related Art

Conventionally, an image formation system including a printer for printing images on printing sheets and a computer (e.g., a personal computer, which will be referred to as a PC hereinafter), which are interconnected through a network (e.g., the Internet) has been known. The computer is for controlling the printer, and typically provided with a storage device storing programs, a RAM (Random Access Memory) temporarily storing data, a CPU (Central Processing Unit) executing processes in accordance with the programs.

In such an image formation system, in order to control an image formation by the printer, a printer driver, which is a control program for the printer, should be installed in the PC. Typically, such a device driver is installed in the PC by executing an installation program.

The installation program is generally included in a installer which also includes the device driver. Specifically, the installer is a group of programs including a driver configuration file which is a main part of the device driver, an initial setting file including a plurality of pieces of data necessary for image formation, and the installation program. The installer is supplied to users in the form of a recording medium (e.g., a CD-ROM) or via a network. By executing the installer in the PC which is to use the image formation device, the driver is installed in the PC.

The installer may be created by an administrator of the printer or the network such that the initial setting file includes a restriction setting which restricts, for example, a color image formation depending on a user of the image formation system. When the device driver is installed in the PC using such an installer, the color image formation by the printer under control of the PC is restricted depending on the user of the PC. An example of such a configuration is described in Japanese Patent Provisional Publication No. P2005-301613A (hereinafter, referred to as '613 publication).

According to the image formation system disclosed in '613 publication, if the user uses a PC, in which the device driver is installed using the installer created by the administrator (specifically, the initial setting file includes the setting made by the administrator is installed), the image formation is executed in accordance with the setting in accordance with the administrator's intension.

According to '613 publication, however, when an image formation is executed with the PC in which the device driver is installed using the installation program created by the administrator, if a general user (i.e., not the administrator) inputs a password, the restriction set by the administrator can be released, and an initial setting file in which the restriction is withdrawn can be used as a new initial setting file at any time.

That is, once the restriction is released, any user can execute the image formation using the new initial setting file, in which the restriction is released. Therefore, according to the configuration disclosed in '613 publication, the image formation system may not be used in accordance with the administrator's intension. That is, even if the administrator sets a limitation to suppress the consumption of color toner and/or printing sheet, the consumption may not be sufficiently suppressed since the initial setting file can be modified such that the restriction is released.

SUMMARY OF THE INVENTION

The present invention is advantageous in that an improved image formation system is provided, with which the setting of the image formation can be made and maintained in accordance with the administrator's intension as much as possible. Aspects of the invention also provide a method of controlling the image formation, and a program that causes a computer to operate as the image formation device described above.

According to an aspect of the invention, there is provided an image formation system, which is provided with a first storage configured to store initial setting containing information, including at least one setting item, necessary for an image formation, a second storage configured to store a lock setting which locks modification of the at least one setting item of the initial setting, an acquiring system configured to acquire release of the lock setting when a file subject to the image formation is selected, an image formation device configured to form an image on a printing sheet in accordance with the file subject to the image formation, the image formation device forming the image in accordance with the initial setting stored in the first storage and the at least one setting item of which the release of the lock setting is acquired by the acquiring system and modification is made, and a re-setting system configured to invalidate the modification of the at least one setting item and make the lock setting effective.

According to another aspect of the invention, there is provided a method of controlling image formation for controlling image formation with an image formation system including a first storage and a second storage capable of storing a plurality of pieces of information, and an image formation device configured to form an image in accordance with a plurality of pieces of information stored in one of the first storage and the second storage. The method includes the steps of first storing initial setting containing information, including at least one setting item, necessary for an image formation in the first storage, the second storing a lock setting which locks modification of the at least one setting item of the initial setting in the second storage, acquiring release of the lock setting when a file subject to the image formation is selected, forming an image on a printing sheet in accordance with the initial setting stored in the first storage and the at least one setting item of which the release of lock thereof is acquired by the step of acquiring and modified, and invalidating the modified setting of the at least one item of which the lock is released and making the lock setting effective.

According to a further aspect of the invention, there is provided with computer-readable recording medium storing instructions which, when executed, causes a computer to function to control image formation with an image formation system including a first storage and a second storage capable of storing a plurality of pieces of information, and an image formation device configured to form an image in accordance with a plurality of pieces of information stored in one of the first storage and the second storage. The instructions include the steps of first storing initial setting containing information, including at least one setting item, necessary for an image formation in the first storage, second storing a lock setting which locks modification of the at least one setting item of the initial setting in the second storage, acquiring release of the lock setting when a file subject to the image formation is selected, forming an image on a printing sheet in accordance with the initial setting stored in the first storage and the at least one setting item of which the release of lock thereof is acquired by the step of acquiring and modified, and invalidating the modified setting of the at least one item of which the lock is released and making the lock setting effective.

According to another aspect, there is provided a computer-readable recording medium storing instructions which, when executed, causes a computer to function as an image formation system including a first storage and a second storage capable of storing a plurality of pieces of information. The instructions include the steps of storing initial setting containing information, including at least one setting item, necessary for an image formation in the first storage, creating a lock setting which locks modification of the at least one setting item of the initial setting in accordance with external input and storing the lock setting crated in the step of creating in the second storage.

A computer-readable recording medium storing instructions which, when executed, causes a computer to function to control image formation with an image formation system including a first storage configured to store initial setting containing information necessary for image formation, a second storage capable of storing a lock setting for locking modification of at least one setting item of the initial setting, and an image formation device configured to form an image on a printing sheet. The instructions include the steps of acquiring release of the lock setting when a file subject to the image formation is selected, forming an image on a printing sheet in accordance with the initial setting stored in the first storage and the at least one setting item of which the release of lock thereof is acquired by the step of acquiring and modified, and invalidating the modified setting of the at least one item of which the lock is released and making the lock setting effective.

BRIEF DESCRIPTION OF THE ACCOMPANYING DRAWINGS

DETAILED DESCRIPTION OF THE EMBODIMENTS

Hereinafter, referring to the accompanying drawings, embodiments according to the invention are described.

First Embodiment

Figure 1:
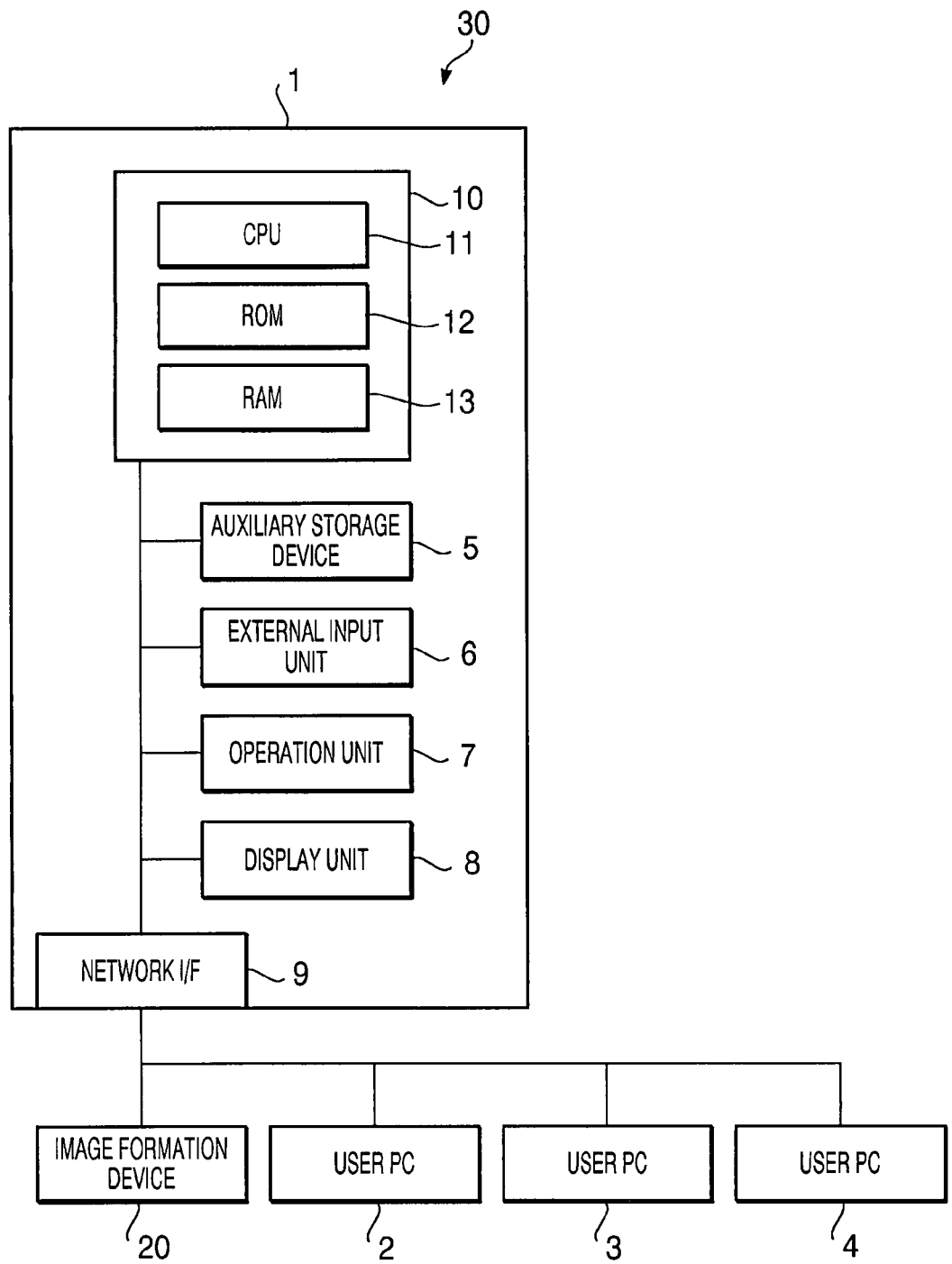
FIG. 1 is a block diagram schematically showing a configuration of an image formation system according to an aspect of the invention.

Firstly, an overall configuration of an image formation system will be described. FIG. 1 is a block diagram schematically showing a configuration of an image formation system 30 to which the present invention is applied.

The image formation system 30 includes an image formation device 20 configured to form (print) images on a medium such as a printing sheet, and a personal computer (hereinafter, referred to as a control PC) 1, which is connected to the image formation device 20 via a network, for controlling the image formation device 20. The image formation system 30 is also provided with a plurality of computers (hereinafter, referred to as user PCs) 2, 3 and 4, which are connected to the image formation device 20 via the network and used by users of the image formation system 30, respectively. It should be noted that the hardware configuration of the control PC 1 is similar to the configuration of each of the user PCs 2, 3 and 4.

Figure 2:
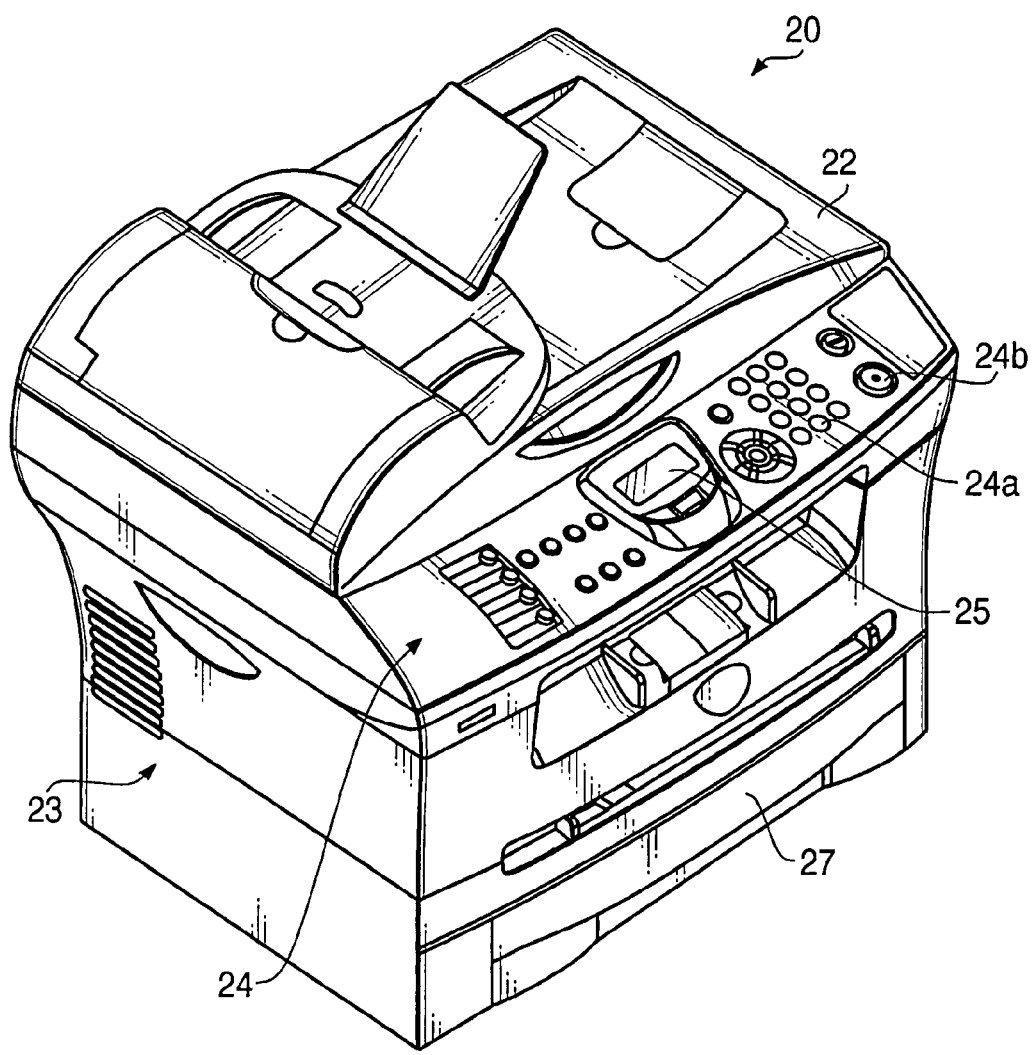
FIG. 2 is a perspective view of an image formation device according to a first embodiment of the invention.

FIG. 2 is a perspective view showing the image formation device 20. The image formation device 20 is an MFP (Multi Function Peripheral) having at least a function of a printer for printing data transmitted from personal computers (in the embodiment, from the control PC 1 and/or the user PCs 2, 3 and 4). The image formation device 20 is capable of executing various printing operations including a color printing, a watermark printing, N-in-One printing (N pages are printed in one page in a reduced manner), and the like.

As shown in FIG. 20, the image formation device 20 includes a sheet tray 27 from which a printing sheet is fed, and a main body 23 which prints an image on the printing sheet fed from the sheet tray 27 based on print data. T he image formation device 20 is provided with a cover 22 which is openably/closably supported on the main body 23, and an operation unit 24 from which the user can input information necessary for operation of the image formation device 20.

The operation unit 24 is provided with a plurality of input keys 24a with which various information can be input, and a start key 24b with which a command for starting the image printing operation can be input, and a display unit 25 for displaying an operational state of the image formation device 20 and the like.

The display unit 25 is provided with an LCD (liquid crystal display) panel which is configured as a touch panel, and through which setting information for printing and the like can be input.

<PC>

Next, the PC 1 (control PC) will be described in detail.

As shown in FIG. 1, the control PC 1 is provided with an input unit 6 which is configured to retrieve data stored in an external medium such as a CD-ROM, an auxiliary storage unit 5 for storing programs and data, an operation unit 7 allowing the user to input various information for operating the control PC 1, a display unit 8 for displaying images, a control unit 10 for controlling components of the control PC 1 (e.g., the input unit 6, operation unit 7, etc.), and a network interface (I/F) for connecting the control PC 1 to a network.

The operation unit 7 includes well-known inputting devices such as mouse and keyboard, and is connected to the control unit 10 via a connection unit (e.g., a USB port: not shown).

The display unit 8 includes a well-known displaying device such as an LCD. The display unit 8 is connected to the control unit 10 via a connecting unit such as a video board (not shown) so that the images output by the control unit 10 are displayed on the display unit 8. In accordance with a GUI (graphical user interface) the personal computer has, various user interface screens (e.g., dialogue windows), mouse pointer and the like are displayed on the display unit 8.

The control unit 10 includes a ROM (read only memory) 12 for storing data which should be kept even if a BIOS is stopped or the power supply is shut off, a RAM (random access memory) 13 for temporarily storing programs and data generated during execution of various programs, and a CPU 11 which executes programs stored in the ROM 12 and RAM 13.

The auxiliary storage device 5 is a well-known HDD (hard disk drive) including integrally provided high-capacity disk and reading/writing device for reading/writing data on/from the disk. On the disk of the auxiliary storage unit 5, at least a system folder including various system files necessary for operation of an OS (operating system), and registry storing information necessary for operations of the system files and/or application programs are stored.

The OS is a well-known operating system (OS) having a multi-task function is installed in the control PC 1. Under an environment of such an OS, application programs such as a text data editing program, image processing program, and the like, device driver (which is a kind of a program) and installing program are executed.

<Device Driver>

Figure 3:
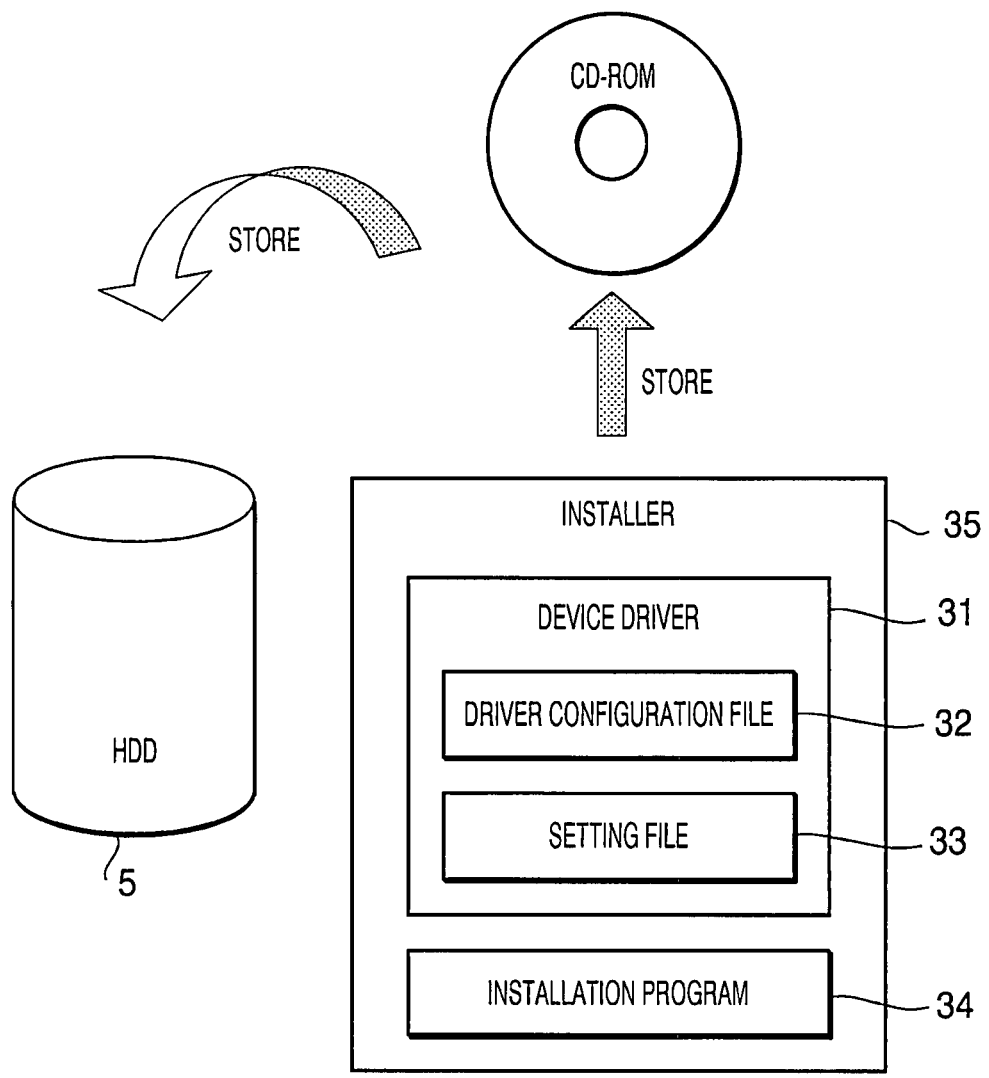
FIG. 3 illustrates a configuration of a device driver according to the first embodiment of the invention.

FIG. 3 schematically illustrates a configuration of the device driver. The device driver 31 functions to output the image data or document (text) data created by the application programs as page description data which can be converted into print data in the image formation device 20 so that the image is formed (printed) by the image formation device 20.

The device driver 31 is provided with a driver configuration file 32 (i.e., which is a so-called printer driver) which serves as a main component of the driver, and setting file 33 including a plurality of pieces of information necessary for printing images on a printing sheet. In order to install the device driver 31, an installer 35, which is a program group containing integrally combined installing program 34 for installing the driver configuration file 32 and the setting file 33 in the control PC 1, and the device driver 31 are stored in the auxiliary storage 5. By executing such an installer 35, the device driver 31 can be installed in the control PC 1.

A personal computer and like acquires the installer 35 by retrieving the same from a CD-ROM or the like. When the install program 35 is executed and the driver configuration file 32 and the setting file 33 are installed in the PC 1, the device driver 31 becomes usable in the personal computer.

The driver configuration file 32 includes the driver file, which is a main file, a display file for displaying setting windows for allowing a user to input various pieces of information (i.e., a file for displaying a user interface), which is a main file for display, and auxiliary file providing auxiliary information when the main file is executed.

Further, the setting file 33 is provided with a setting information file which is a file containing necessary setting information to make the image formation device 20 operable, and an initialization file containing information necessary for initial setting of the image formation device 20 (e.g., a printing sheet size, for printing the image on the printing sheet, the number of pages) which is necessary when the image formation device 20 prints the image on the printing sheet.

The installing program 34 includes a first install program including a program for creating a new installer containing restricted contents based on the information input through the operation unit 7, and a main component of the installing program for installing the device driver 31 in the PC 1, and a second install program consists of only the main component of the install program.

Incidentally, the term "install" used herein means to introduce an application in the personal computer, and to execute a setting operation necessary for each application to functions in the personal computer. Specifically, in the specification, when the main component of the installing program is executed, the driver configuration file 32 and setting file 33 are stored in the system folder in the auxiliary storage unit 5, and necessary settings (i.e., contents of the setting information file) to operate the image formation device 20 are stored in the registry.

<Installer Creating Process>

Next, an installer creating process executed by the CPU 11 of the control PC 1 will be described.

Figure 4:
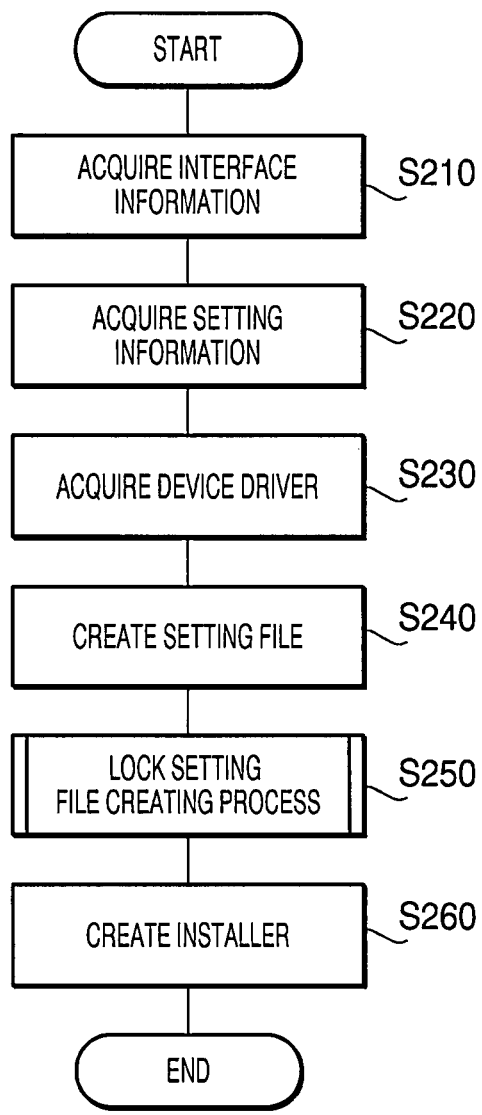
FIG. 4 is a flowchart illustrating an installer creating process for creating an installer, according to the first embodiment.

FIG. 4 is a flowchart illustrating the installer creating process. The installer creating process is started when the installer creating process is selected on a menu window displayed on the display unit 8. When the installer creating process is started, the process acquires information for identifying connection type between each of the user PCs 2, 3 and 4, for which the installer is created and the printer (which is the image formation device 20, according to the embodiment) controlled by the user PCs 2, 3 and 4.

Figure 6A:
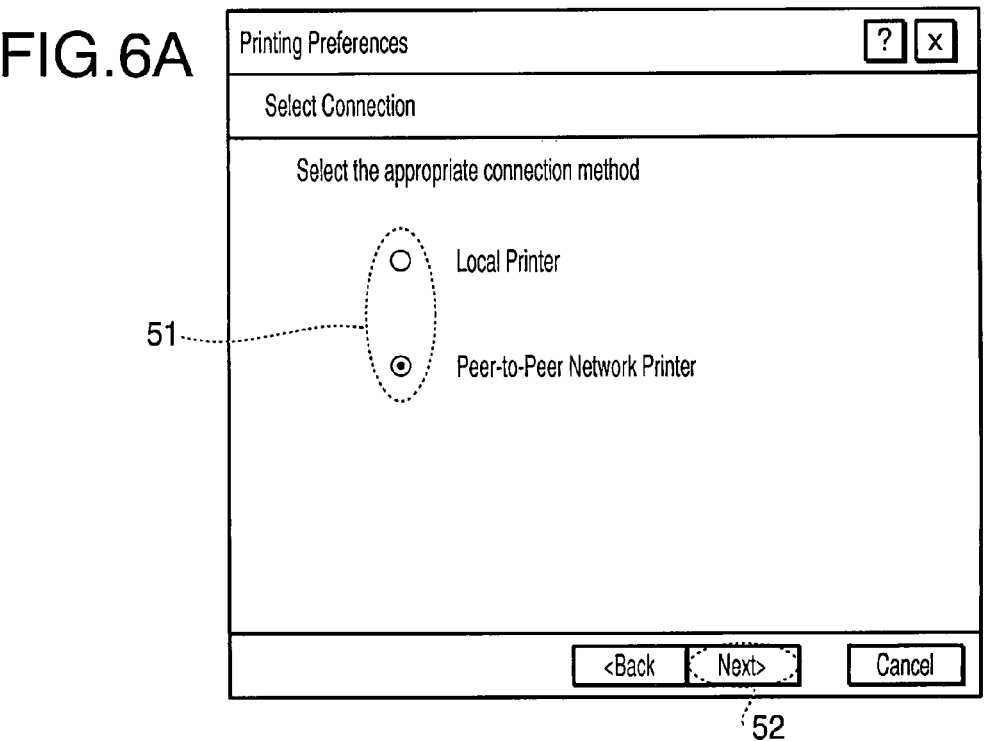
FIGS. 6A, 6B, 7A, 7B and 8 show exemplary dialogue windows allowing a user to input information necessary in the installer creating process.

Specifically, an I/F (interface) selection window allowing the user to select a connection type as shown in FIG. 6A is displayed. Then, in response to the information input through the I/F selection window, the process acquires information on the connection type. That is, when the user depresses the selection button 51 on the I/F selection window using the operation unit 7 (i.e., using the mouse), the process recognizes the connection type for the controlled printer (i.e., MFP), and acquires the information regarding the connection type as recognized when the NEXT button 52 is depressed.

It should be noted that the connection type includes a local connection with which the controlling printer is directly connected to the managing PC 1 through a serial port or the USB port, a network connection with which the controlling printer is indirectly connected to the managing PC 1 through a network, and the like. In the following description, as an example, a case where the network connection is employed will be explained.

Figure 6B:
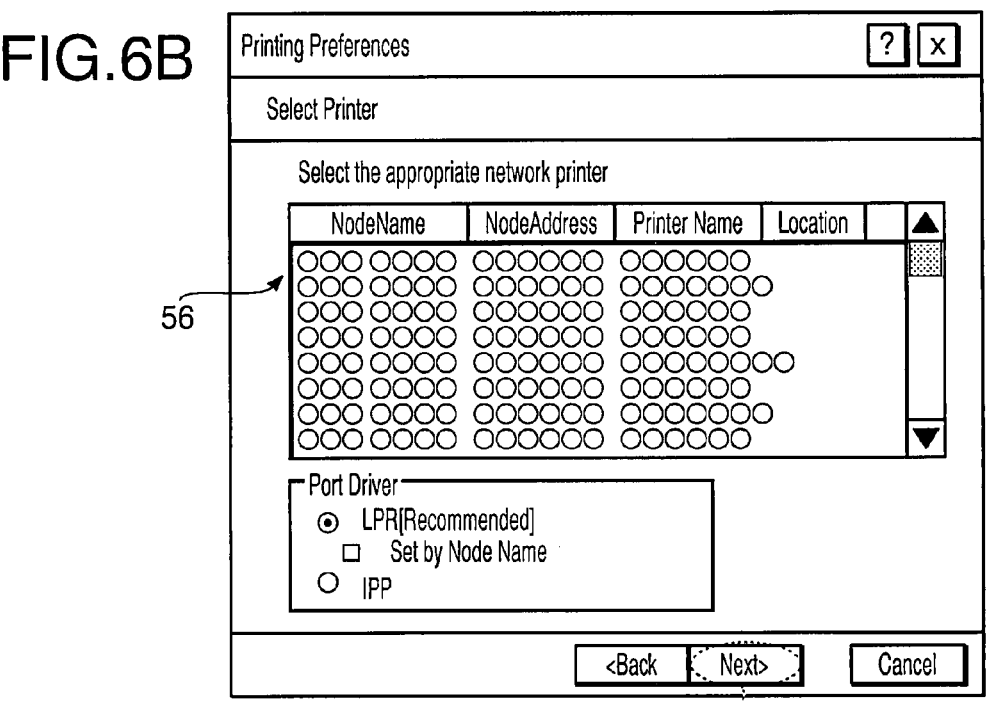

In S220, a controlled printer is selected from among the image formation devices which are currently connected in accordance with the connection type selected in S210. Specifically, according to the embodiment, a controlled printer selection window, which allows a user to select a controlled printer, as shown in FIG. 6B is displayed. Based on information input through the controlled printer selection window, a controlled printer which will be controlled using the user PCs 2, 3 and 4 is determined.

Thus, according to the embodiment, when the user selects a controlled printer (for example, using the mouse) from among the printers listed in the display area 56 of the selection window shown in FIG. 6B using the operation unit 7, the process recognizes the selected controlled printer. Thereafter, when the user depresses the NEXT button 57 (see FIG. 6B), setting information of the recognized (selected) controlled printer is retrieved from the registry of the auxiliary storage device 5.

It should be noted that the setting information retrieved in S220 includes the name of the selected controlled printer, IP address, node name and node address, port driver of the controlled printer and the like.

Figure 7A:
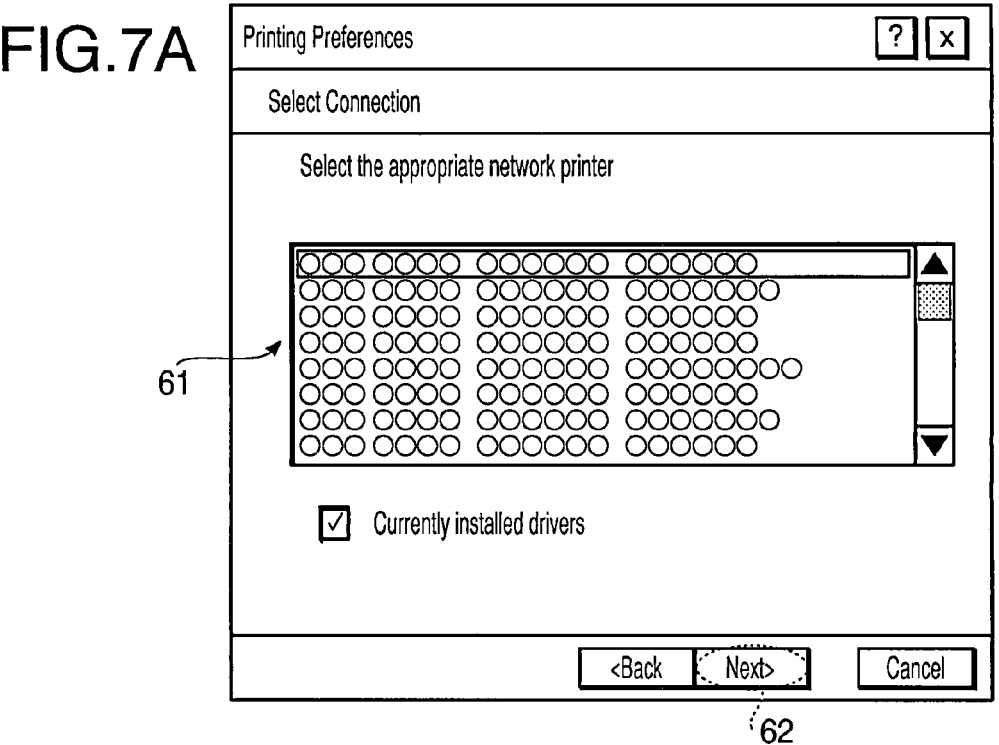

In S230, the process acquires the device driver (i.e., driver configuration file) corresponding to the controlled printer selected in S220. Specifically, according to the embodiment, a driver selection window as shown in FIG. 7A is displayed on the display unit 8 to allow the user to select the device driver. Then, based on the information input through the driver selection window, the process determines the device driver corresponding to the controlled printer.

Thus, according to the embodiment, when the user select a device driver (corresponding to the selected controlled printer) from among the device drivers which are installed in the managing PC 1 and indicated in the list 61 displayed in the driver selection window (see FIG. 7A), the process recognizes the selected device driver. Thereafter, when the NEXT button 62 is depressed, the process copies to acquire the driver configuration file of the device driver as recognized from the system folder of the auxiliary storage device 5.

In S240, the process copies to acquire a setting file (i.e., an initial setting file) corresponding to the device driver acquired in S230 from the auxiliary storage device 5. Then, the process modifies the initial setting file and/or the setting information acquired in S220 in accordance with the user PCs 2, 3 and 4 to create setting files for the newly created installer.

Figure 7B:
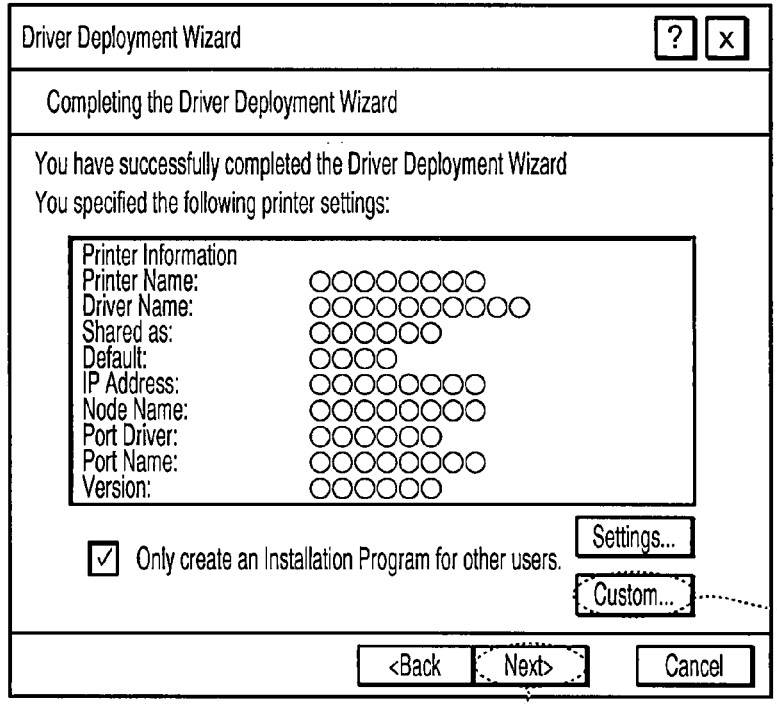

Specifically, the process displays the setting information displaying window as shown in FIG. 7B on the display unit 8 to allow the user to confirm the contents of the setting file newly created and to make modification of the setting information and/or initial settings when necessary. Then, the process creates the setting file for the newly created installer in accordance with the information indicated/modified through the setting information displaying window.

Thus, according to the embodiment, if there are errors in the setting information displayed in the setting information displaying window, the user can correct the setting information by inputting information through the operation unit 7. If there are no errors in the setting information, the one acquired in S220 is maintained.

Figure 8:
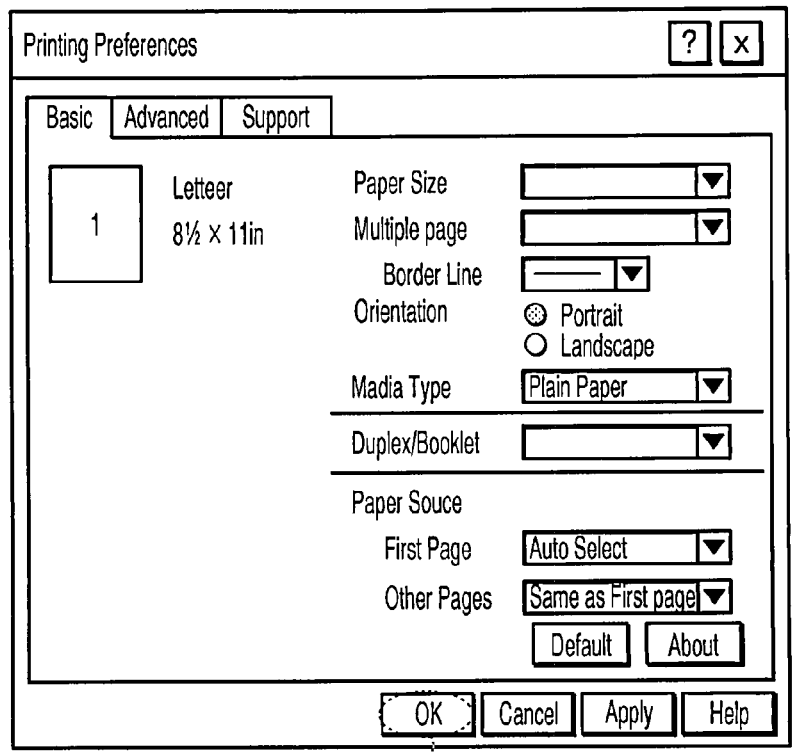

According to the embodiment, when the user depresses a customizing button 68 for modifying the settings, a setting modifying window as shown in FIG. 8 is displayed on the displaying unit 8. Then, in accordance with the information input through the setting modifying window, the process modifies the initial settings. In response to depression of the OK button 69 of the setting modifying window by the user, the process recognizes the modified settings and then displays the setting information displaying window. If the customizing button 68 is not depressed, the process maintains the initial settings acquired from the auxiliary storage device 5.

When the NEXT button 67 shown in FIG. 7B is depressed, a setting file including a file containing the setting information as recognized and a file containing the initial settings as recognized (S240).

In S250, the process acquires a lock item which is information for prohibiting a part of operation of the controlled printer to print an image, and a lock setting process for creating a lock setting file containing the lock item is called. The lock item and the lock setting process will be described later.

In S260, the process copies to acquire a second installation program from the auxiliary storage device 5. Then, the process newly creates an installer which integrally contains the second installation program, the driver configuration file acquired in S230, the setting file created in S240 and the lock setting file created in S250. After the new installer is created, the process is finished.

Thus, if the printing operation by the user PCs 2, 3 and 4 is to be partially prohibited, the new installer is supplied to the user PCs 2, 3 and 4. The new installer may be delivered to each of the user PCs 2, 3 and 4 through a network or the like.

<Lock Setting Process>

Next, the lock setting process referred to above (S250) will be described in detail.

Figure 5:
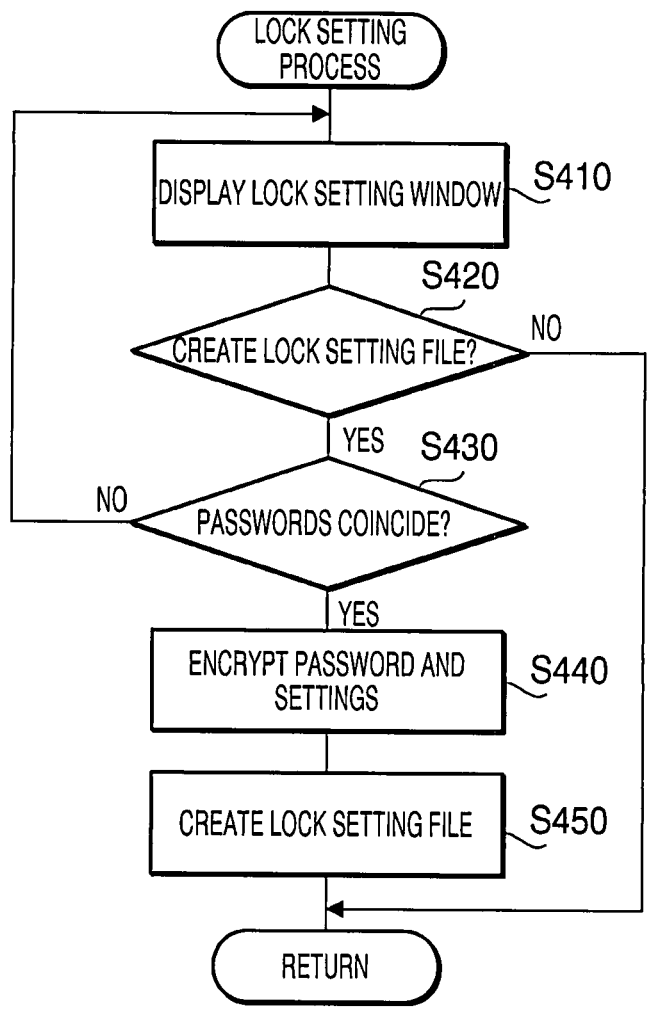
FIG. 5 is a flowchart illustrating a rock setting process to be executed in the installer creating process.
Figure 9:
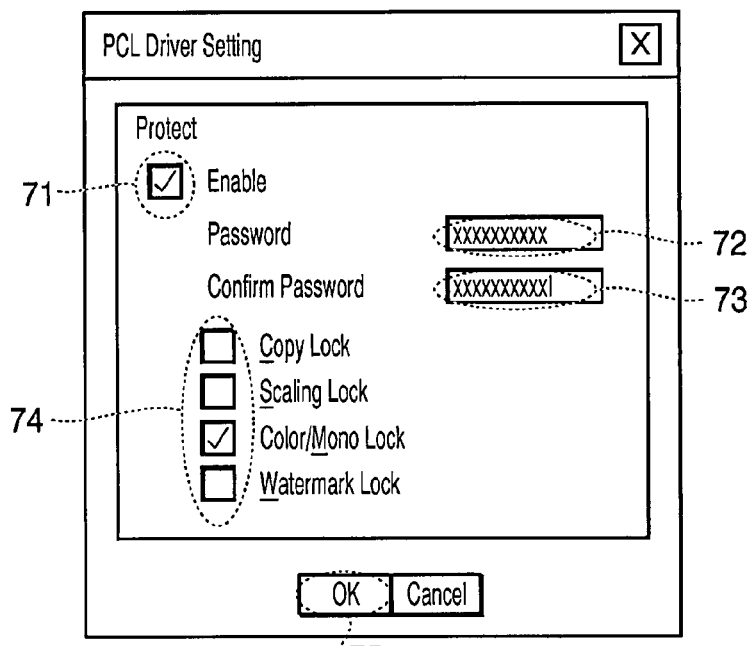
FIG. 9 shows an exemplary dialogue window allowing the user to input information necessary in a lock setting process.

FIG. 5 is a flowchart illustrating the lock setting process, and FIG. 9 shows a lock setting window through which the user can input various pieces of information necessary for the lock setting. As indicated in FIG. 9, the lock setting window is provided with an enable information check box 71, a password input box 72, a password confirmation box 73 and lock items check boxes 74. When the enable information check box 71 is checked (as shown in FIG. 9), the lock setting file is created. The password input box 72 and the password confirmation box 73 are used for identifying the user of the image formation system 30. Only when the passwords input in the password input box 72 and in the password confirmation box 73 are identical, the input password is regarded as a correct password.

When the lock setting process is started, firstly the process displays the lock setting window (e.g., FIG. 9) on the display unit 8 in order to acquire various pieces of information input through the lock setting window.

Specifically, according to the embodiment, the user is allowed to check/uncheck each of the check boxes 71 and 74, and input the password in the password input box 72 and the password confirmation box 73 through the operation unit 7. Then, in response to depression of the OK button 75, the process acquires the information input through the lock setting window and stores the acquired information in the RAM 13.

In S420, the process judges whether the lock setting file is to be created based on the information acquired in S410. That is, the judgment is made based on whether the enable information check box 71 is checked or not. If the process judges that the lock setting file is not to be created (S420: NO), the lock setting file is not created and the process is finished. If the lock setting file is to be created (S420: YES), the process proceeds to S430.

In S430, the process judges whether the two passwords input in the password input box 72 and the password confirmation box 73 are identical. If the two passwords are not identical (S430: NO), the process deletes the information acquired in S410 and stored in the RAM 13, displays an error message indicating that the two passwords are not identical, and then returns to S410 to restart the process. If the two passwords are identical (S430: YES), the process proceeds to S440.

In S440, the process encrypts the lock items whose check boxes 74 are checked and the password input in the password input box 72 in accordance with a well-known encrypting method.

As the lock items, a color print prohibiting item which prevents color printing, a watermark print prohibiting item which prevents printing of a watermark, an N-in-one setting change prohibiting item which prevents change of the N-in-one setting originally applied to the print data, scaling lock, color/mono lock and the like may be designated. In the example shown in FIG. 9, among the plurality of lock items, only the color print prohibiting item is checked.

In S450, the process creates the lock setting file containing the lock items encrypted in S440 and the password as a part of the setting file. Then, the lock setting process is finished and the process proceeds to S260. As above, in the lock setting process, the lock setting file containing the lock items representing a part of the operation to be prohibited when the controlled printer executes a printing operation is created based on the information which is input through the lock setting window by the user of the managing PC 1.

Next, the user PCs 2, 3 and 4 will be described. As mentioned above, the user PCs 2, 3 and 4 are personal computers configured similarly to the managing PC 1. Each of the user PCs 2, 3 and 4 acquires the installer which is created as the CPU 11 of the managing PC 1 executes the installer creating process, and is distributed via the network or the like. Each of the PCs 2, 3 and 4 executes a second install program included in the installer thus acquired, thereby the device driver is installed.

In each of the user PCs 2, 3 and 4, in which the device driver has been installed, the device driver stored in the auxiliary storage device 5a to the RAM 13a, and then, by execution of OS, application program and device driver in an associated manner, it becomes possible to make the controlled printer (i.e., the image formation device 20) to execute the printing operation in accordance with the initial setting, setting information and lock items. In order to distinguish the components of the user PCs 2, 3 and 4 from those of the management PC 1, a suffix "a" is added to the reference numerals of each component of the user PCs 2, 3 and 4 (e.g., the auxiliary storage device 5a, the RAM 13a . . . ).

Figure 10:
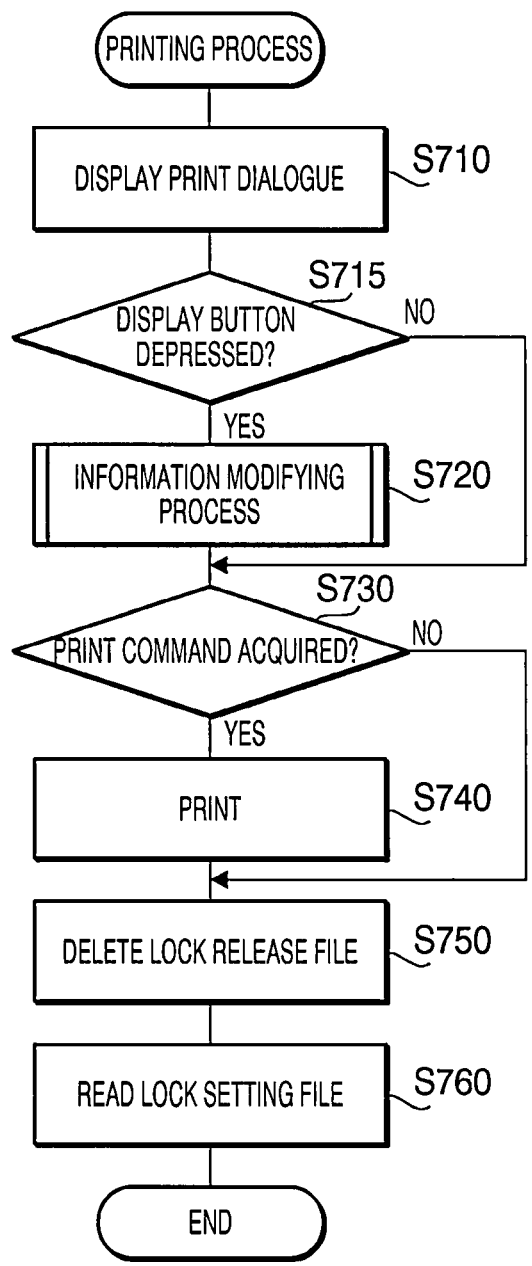
FIG. 10 is a flowchart illustrating a printing process according to the first embodiment.

Next, a printing process executed by the CPU 11a of the user PC 2 (3 or 4) will be described. FIG. 10 is a flowchart illustrating the printing process executed by the CPU 11a. It should be noted that the printing process is started in response to selection of the printing process on a menu displayed on the display unit 8a during execution of the application program (e.g., text data creating program, image processing program, etc.).

When the printing process is started, in S710, the process displays a print dialogue including setting information of the image formation device 20, a property display button for displaying a property window (see FIG. 13), a print execution button for starting the printing operation. Thereafter, the process proceeds to S715.

In S715, the process judges whether the user depressed the property display button in the print dialogue with an operation unit 7a. If the property display button has been depressed (S715: YES), the process proceeds to S720 and executes an information modifying process (described later). In the information modifying process, modification of the lock items and initial settings is acquired, and a lock release file reflecting the modification is created and the initial setting file is updated. Then, the process stores the lock release file and the update initial setting file in the RAM 13a, and proceeds to S730.

In S730, the process judges whether an execution command to start printing with the image formation device 20 is input. If the process has judged that the execution command has been input, it proceeds to S740.

If the display button in not depressed (S715: NO), the process proceeds to S730 without executing S720. That is, when the information modifying process is not executed, the creation of the lock release file and the update of the initial setting file are not executed. Therefore, in the RAM 13a, the lock setting file and the initial setting file which has not been updated are stored.

In S740, the process make image formation device 20 to execute printing operation in accordance with the lock items of the lock release file stored in the RAM 13a (if the lock release file does not exist, the lock setting file is referred to) and the initial settings indicated in the initial setting file. Thereafter, the process proceeds to S750.

If the process judges that the execution command has not been input (S730: NO), the process proceeds to S750.

In S750, the process deletes the lock release file stored in the RAM 13a and proceeds to S760. It is noted that, if the lock release file does not exist in the RAM 13a, the process does nothing and proceeds to S760.

In S760, the process retrieves the lock setting file, and stores the same in the RAM 13a. That is, the lock items to be used for the printing are set as the lock items in the lock setting file.

Figure 11:
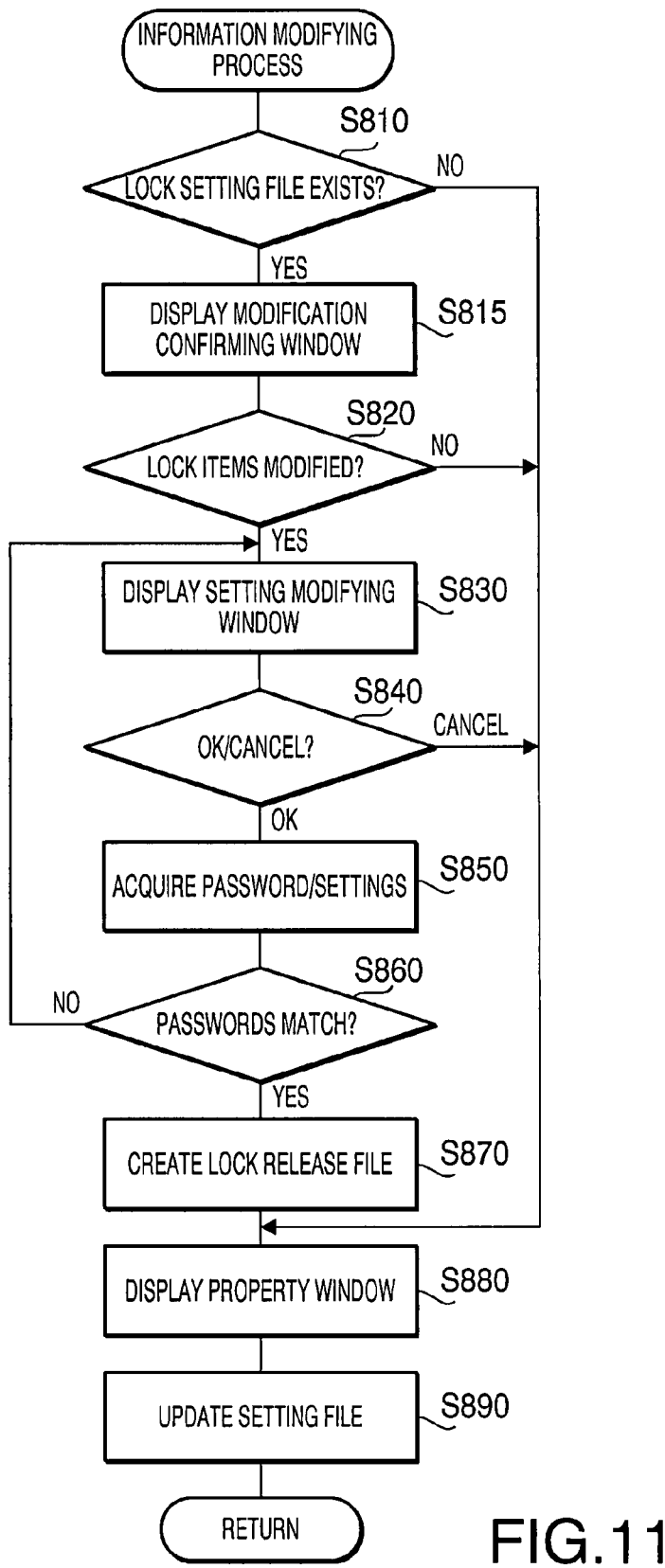
FIG. 11 is a flowchart illustrating an information modifying process according to the first embodiment.

Next, the information modifying process, which is to be executed by the CPU 11a of the user PC 2 (3 or 4) and is called in S720 of the printing process, will be described. FIG. 11 is a flowchart illustrating the information modifying process.

Figure 12A:
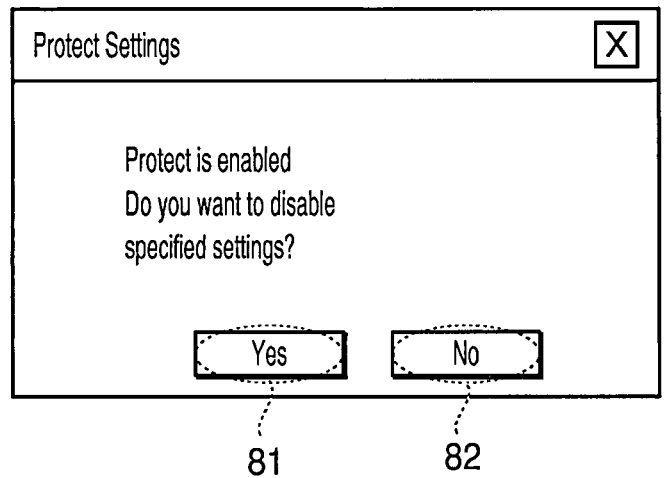
FIGS. 12A, 12B and 13 show exemplary dialogue windows allowing the user to input necessary information in the information modifying process according to the first embodiment.
Figure 12B:
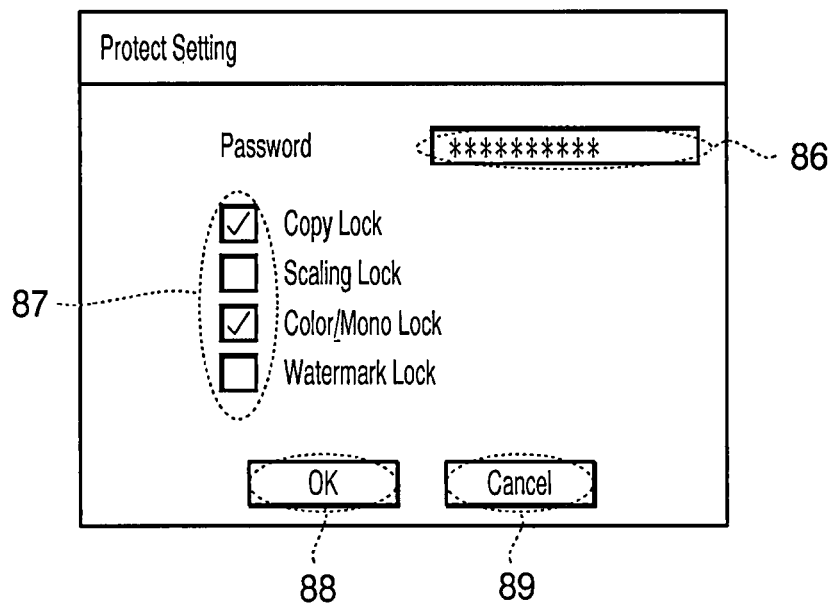

FIGS. 12A and 12B show lock setting windows for inputting the lock items to be used in the printing process. Specifically, the lock setting windows include a first lock setting window, as shown in FIG. 12A, including buttons to input whether the lock items in the lock setting file are changed, and a second lock setting window, as shown in FIG. 12B, for inputting the lock items. The second lock setting window includes a password input box 86, information input boxes (check boxes) 87 which are checked when the lock items are to be used, an OK button 88 for establishing the input information, and the cancel button for canceling the input operation.

Figure 13:
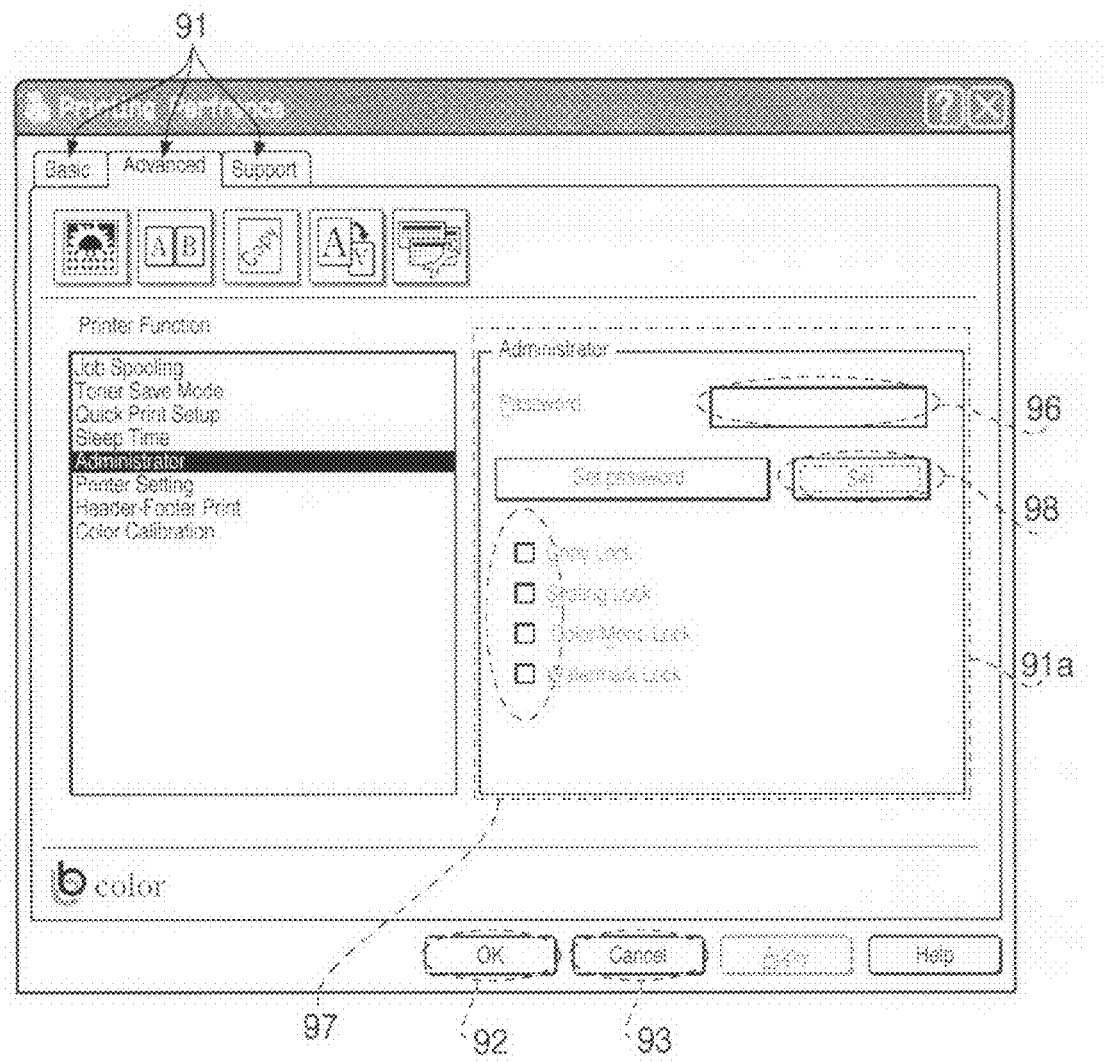

FIG. 13 shows the property window for inputting the initial settings to be used in the printing process. The property window includes tabs 91 for switching among types of information to be input, an OK button 92 for establishing the input information, a cancel button 93 for canceling input operation. It should be noted that, when one of the tabs 91a is depressed to switch the property windows, as shown in FIG. 13, the lock setting area 91a for inputting the lock items is displayed in gray; and configured not to acquire user's input.

It should be noted that, when the property window is opened by opening the printer folder and opening the property window for the initial setting of the image formation device 20 (i.e., setting window for various settings to be reflected when the printing is executed), the lock setting area 91a is displayed in gray and no inputting operation is accepted as shown in FIG. 13.

When the information modifying process is started, in S810, the process judges whether the lock setting file is included in the setting file. If the lock setting file is included in the setting file (S810: YES), the process displays the first lock setting window as shown in FIG. 12A on the display unit 8a in S815. It should be noted that, in S815, the first lock setting window is displayed on the frontmost side among a plurality of windows displayed on the display unit 8a. Thereafter, the process proceeds to S820.

In S820, the process acquires selection information representing whether the lock items are to be modified. Then, based on the selection information, the process judges whether the lock items are to be modified. If the lock items are to be modified (S820: YES), the process decrypts the lock items and password in the lock setting file and stores the same in the RAM 13a, and proceeds to S830.

According to the embodiment, when the YES button 81 of the first lock setting window is depressed, the process judges that the lock items are to be modified. When the NO button 82 is depressed, the process judges that the lock items will not be modified.

In S830, the process displays the second lock setting window as shown in FIG. 12B for allowing the user to modify the lock items. In S840, the process judges whether the OK button 88 of the second lock setting window is depressed or the Cancel button 89 is depressed. If the OK button 88 has been depressed, the process proceeds to S850.

In S850, the process acquires the password and lock items input through the second lock setting window. As shown in FIG. 12B, the information input boxes 87 of the second lock setting window are displayed such that the lock items input in the lock setting process are reflected, and the user is allowed to select desired ones of predetermined lock items.

In S860, the process judges whether the password acquired in S850 matches the password stored in the RAM 13a in S820. If the passwords do not match (S860: NO), the process returns to S830, while if the passwords match (S860: YES), the process proceeds to S870.

In S870, the process creates the lock release file which is a file including the lock items acquired in S850.

If the process judges that the lock setting file does not exist (S810: NO), the lock items will not be modified (S820: NO), or the Cancel button 89 has been depressed (S840: Cancel), the process proceeds to S880.

Thus, the process proceeds to S880 when the modification of the lock items has been completed or no modification will be made. In S880, the initial setting file is stored in the RAM 13a, and the process displays the property window reflecting the initial settings represented by the initial setting file as shown in FIG. 13.

In S890, the process acquires the information input through the property window displayed in S880, and reflects the information in the initial setting included in the initial setting file. Specifically, according to the embodiment, in response to depression of the OK button 92, the process acquires the information displayed in the property window, and rewrites the initial setting in the initial setting file. If the Cancel button 93 is depressed, the initial setting in the initial setting file is maintained.

After execution of S890, the information modifying process is finished, and the process proceeds to S730 of the printing process.

As described above, in the information modifying process, based on the information input through the lock setting window, the process creates the lock release file which is a file containing the lock items to be used when the image is printed with the image formation device 20. Further, the process modifies the initial setting in the initial setting file based on the information input through the property window.

In the printing process, the image formation device 20 executes the printing operation in accordance with the lock items stored in the RAM 13a, and initial setting in the initial setting file. After the printing operation is completed, the process deletes the lock release file and sets the lock items of the lock setting file as the information to be referred to when the printing is executed.

As described above, according to the image formation system 30 according to the first embodiment, if the lock release file representing the modified lock items is not created when the printing operation is executed, the printing operation is executed based on the lock items of the lock setting file. Therefore, it is possible to increase a probability that the printing operation is executed with the lock items being unchanged.

Therefore, it is likely that the printing operation is executed in accordance with the intension of the administrator who created the lock setting file. Therefore, if the color printing prohibiting item is set as the lock item as in the first embodiment described above, it is possible to suppress consumption of the printing sheets and color toners.

Further, according to the image formation system 30 described above, every time when the printing operation with the image formation device 20 is finished, the lock release file is deleted, and the lock items in the lock setting file is re-set for the subsequent printing operations. Therefore, it is ensured that the printing operations may be executed in accordance with the administrator's intension.

Further, if the password input in the information modifying process and the password give by the administrator do not match (do not identical), a user cannot release the lock items. Therefore, the lock items will not be unnecessarily released. Accordingly, it is very likely that the printing operations can be executed with the lock items being unchanged, that is, in accordance with the administrator's intension.

Furthermore, according to the image formation system 30 described above, the first lock setting window is displayed on the frontmost side among a plurality of windows displayed on the display unit 8a. Therefore, the user of the user PC does not fail to recognize the existence if the lock items.

According to the installer creating process described above, it is possible to create an installer corresponding to the user PC in which the installer functions. Therefore, the appropriate lock items can be set for the user PC, and it becomes very likely that the printing operations will be executed in accordance with the administrator's intension. As a result, it is ensured that consumption of the sheets/toners can be suppressed.

Second Embodiment

Next, a second embodiment according to the present invention will be described.

The difference between the second embodiment in comparison with the first embodiment described above is the information modifying process. Therefore, for the same configurations between the first and second embodiments, the same reference numerals are given and the description thereof will be omitted for brevity, and different configurations will be mainly described.

Figures 14A, 14B:
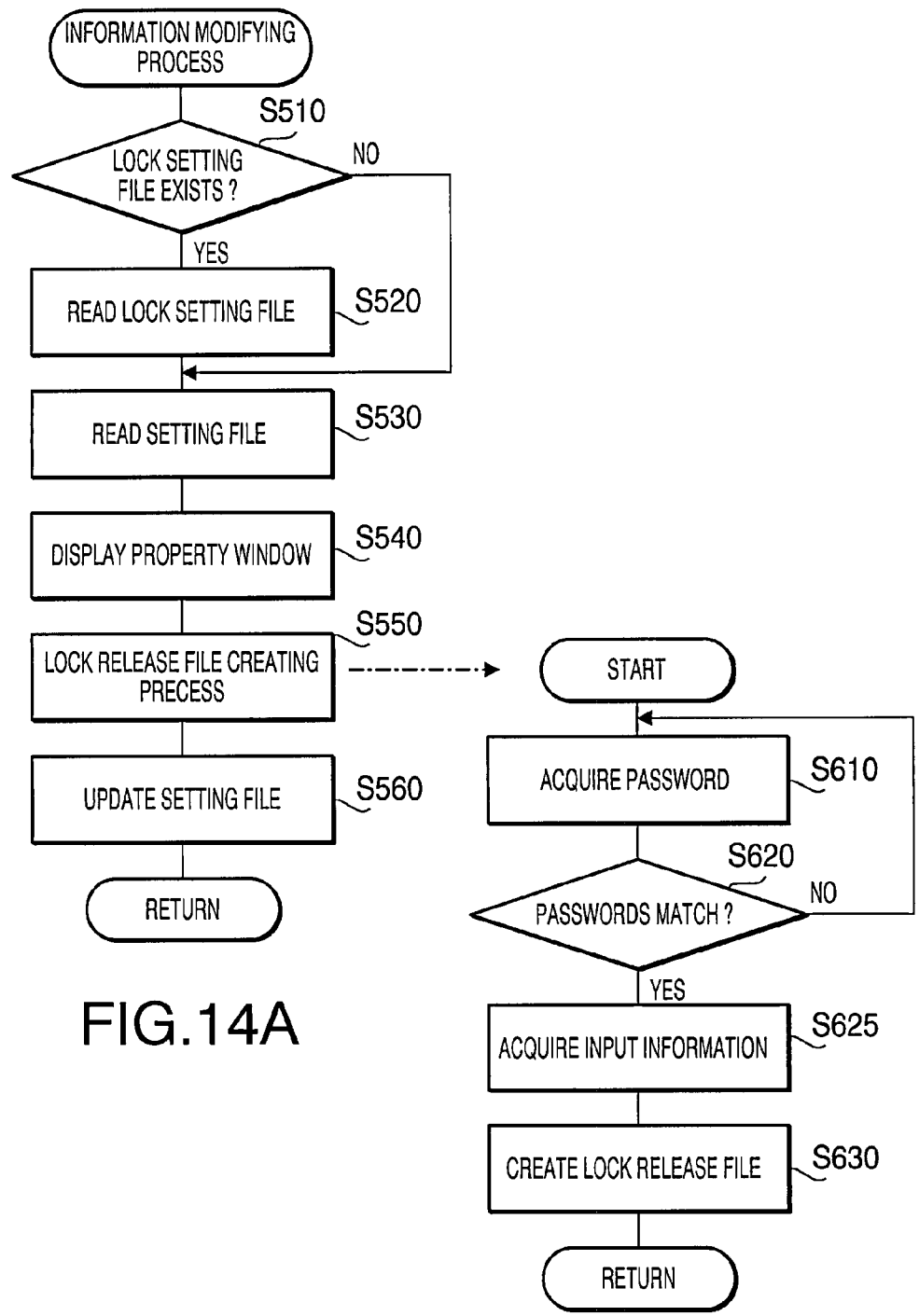
FIGS. 14A and 14B show flowcharts illustrating an information modifying process and a lock release file creating process according to a second embodiment.
Figure 15:
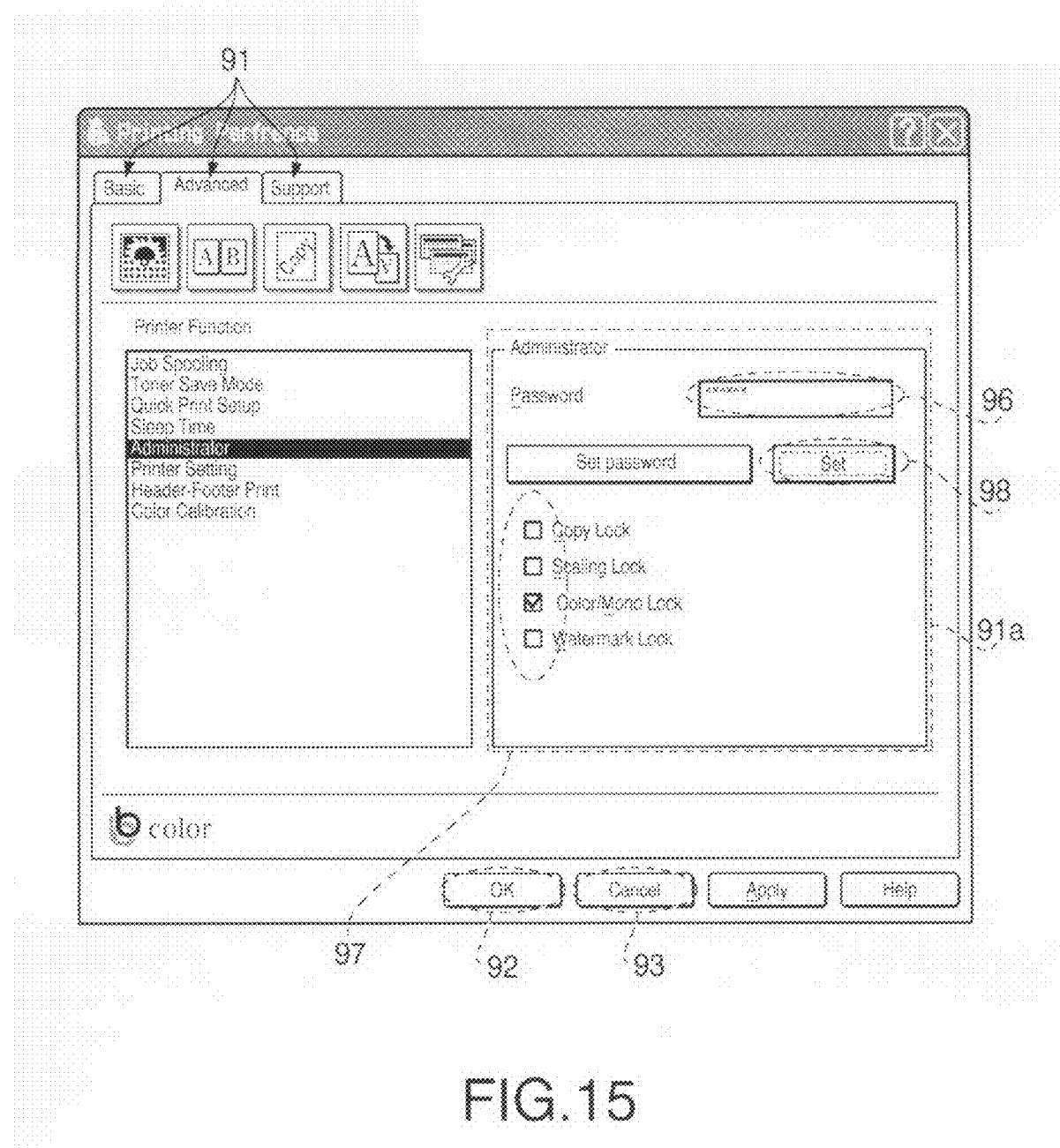
FIG. 15 shows an exemplary dialogue window allowing the user to input necessary information in the information modifying process according to the second embodiment.

FIGS. 14A and 14B are flowcharts showing the information modifying process and lock release file creating process according to the second embodiment. FIG. 15 is a property window for inputting the initial settings and lock items.

It should be noted that the property window shown in FIG. 15 is displayed when one of the tabs 91 is selected. In the property window shown in FIG. 15, different from that shown in FIG. 13, the lock setting area 91a for inputting the lock items is configured such that the user can check/uncheck each of modification input boxes 97. The lock setting area 91a is also provided with a password input box 96, and SET button 98 for establishing the input information.

As shown in FIG. 14A, when the information modifying process according to the second embodiment is started, the process judges whether the lock setting file is included in the setting folder in S510. If the lock setting file exists (S510: YES), the process proceeds to S520.

In S520, the process decrypts the lock items and password in the lock setting file, and stores the same in the RAM 13*a*.

If the lock setting file does not exit in the setting folder (S510: NO), the process skips S520 and proceeds to S530.

In S530, the process acquires the initial setting in the initial setting file, and stores the initial settings in the RAM 13*a*. Then, in S540, the process displays the property window reflecting the lock items stored in the RAM 13*a* and the initial settings acquired in S530 (see FIG. 15).

In S550, the process executes the lock release file creating process for creating the lock release file to be used when the image formation device 20 executes the printing operation. It should be noted that the lock release file creating process according to the second embodiment is started when only the password input box 96 and the SET button 98 are displayed within the lock setting area 91*a*, and the password is input in the password input box 96 and the SET button 98 is depressed.

When the lock release file creating process is started (see FIG. 14B), the process acquires the password input in the password input box 96. Then, the process judges whether the password acquired in S610 matches the password acquired in S520 and stored in the RAM 13*a*. If the passwords are not identical (S620: NO), the process returns to S610 to make the user input the password in the password input box 96. When the passwords match (S620: YES), the process changes the color of the modification input boxes 97 from gray to the normal color (e.g., black) and allows the user to check/uncheck the modification input boxes 97 (i.e., the modification input boxes 97 reflects the input through the operation unit 7*a*), and the lock items are displayed such that the lock items input in the lock setting process are reflected.

In S625, if the check is input in the modification input boxes 97, and the OK button 92 is depressed, the process acquires the information regarding the lock items corresponding to the modification input boxes 97. Then, the process proceeds to S630.

In S630, the process creates the lock release file which is a file containing the lock items acquired in S610. Thereafter, the process proceeds to S560 of the information modifying process.

In S560, the process acquires the information input through windows corresponding to the tabs other than the tab for the lock setting area 91*a*, and the process reflects the information in the initial settings in the initial setting file. Specifically, according to the second embodiment, the process acquires the information input in the property window and rewrites the initial settings in the initial setting file in response to the depression of the OK button 92 of the property window. If the Cancel button 93 is depressed, the initial settings in the initial setting file are maintained.

As described above, according to the information modifying process of the second embodiment, if the password input by the user and the password given by the administrator do not coincide with each other, the user cannot release the lock items included in the lock setting file. Therefore, according to the second embodiment, it is possible to prevent the lock items from modified unnecessarily. Thus, according to the second embodiment, it is very likely that the printing operation is executed in accordance with the administrator's intension.

Further, according to the second embodiment, the modification of the lock items and the initial settings in a single property window. Since the user need not operate a plurality of kinds of user interfaces (i.e., setting windows), operability of the image formation system can be improved.

It should be noted that the invention should not be limited to the above-described illustrative embodiments and various modification can be made without departing from the scope of the invention.

For example, in the above-described embodiments, the image formation device 20 is described as a network device connected through a network. However, the image formation device 20 may be a locally connected device.

In the above-described embodiments, only the color print prohibition item is described as a lock item. However, other items may be set optionally or alternatively as the prohibited items. For example, a watermark print inhibition item for prohibiting the printing of the watermark, N-in-one print modification prohibiting item for prohibiting modification of the N-in-One print setting may be set. Alternatively or optionally, the maximum number of printing sheets which can be used in a single printing job may be set as the lock item.

It should be stressed that, if the N-in-ONE print modification prohibiting item and/or the maximum number of sheets for one printing job is set, the consumption of the sheet and/or toner will be well suppressed.

In the first installer creating process, an installer including the second install program is created. However, the program included in the installer may be a first install program which includes the installer creating process.

Further, the setting modification window used in the installer creating process may be shared with the property window.

Furthermore, in the embodiments described above, the installer 35 is installed in the management PC 1, and the installer creating process is executed in the management PC 1. However, the invention need not be limited to the above-described configurations.

For example, the first install program may be stored in the image formation device 20, and the image formation device 20 is configured to executed the installer creating process. In such a case, the based on the information input through the operation unit 24, the CPU of the image formation device 20 may execute the installer creating process.

What is claimed is:

1. An image formation system, comprising:
   one or more processors; and
   one or more storage devices having stored therein:
   an initial setting file containing image formation configuration information for image formation; and
   a lock setting file, containing information identifying a lock setting of an image formation configuration setting in the initial setting file; and
   instructions that, when executed by the one or more processors, cause the following to occur:
   acquire release of the lock setting for a first image to be formed;
   acquire and authenticate a password, and after authenticating the password, create a lock release file in the one or more storage devices, the lock release file including information identifying which lock setting has been changed, and identifying a replacement setting for the image formation configuration setting identified in the lock setting file;

form the first image on a printing sheet in accordance with the initial setting file and the information included in the lock release file; and delete the lock release file, and revert to using the lock setting file's settings for a subsequent image formation.

2. The image formation system according to claim 1, wherein the instructions further include instructions that, when executed by the one or more processors, cause creation of the lock setting file in accordance with externally input information.

3. The image formation system according to claim 2, wherein the instructions further include instructions that, when executed by the one or more processors, cause the system to perform the authenticating of the password by comparing the password to an assigned password for identifying a user to the lock setting in the lock setting file.

4. The image formation system according to claim 1, wherein the instructions further include instructions that, when executed by the one or more processors, cause the system to display, on a screen, a dialogue allowing a user to modify at least one item of the initial setting file.

5. The image formation system according to claim 4, wherein the dialogue is displayed as a frontmost window on the screen.

6. The image formation system according to claim 1, wherein the lock setting file includes at least information for locking modification of a setting item representing whether the image formation with the image formation system is executed in a plurality of colors.

7. A method of controlling image formation, the method comprising the steps of:

storing an initial setting file in a storage, the initial setting file including at least one image formation configuration setting for an image formation;

storing a lock setting file containing information identifying a lock setting of an image formation configuration setting in the initial setting file;

acquiring release of the lock setting for forming a first image;

acquire and authenticate a password, and after authenticating the password, storing a lock release file including information identifying which lock setting has been changed, and identifying a replacement setting for the image formation configuration setting identified in the lock setting file;

forming the first image on a printing sheet in accordance with the initial setting file and the information included in the lock release file; and deleting the lock release file after the first image is formed, and making the lock setting file effective for a subsequent image formation.

8. The method according to claim 7, further comprising creating the lock setting file in accordance with externally input information.

9. The method according to claim 8, wherein the step of authenticating the password includes comparing the password to an assigned password for identifying a user.

10. The method according to claim 7, wherein the step of acquiring the release of the lock setting includes displaying, on a screen, a dialogue acquiring modification of the setting in the initial setting file.

11. The method according to claim 10, wherein the step of displaying displays the dialogue as a frontmost window on the screen.

12. The method of claim 7, wherein the deleting the lock release file after the first image is formed is performed automatically in response to completion of forming the first image.

13. A non-transitory computer-readable recording medium storing instructions which, when executed by a processor, causes the following to occur:

storing a lock setting file containing information identifying a locked status of an image formation configuration setting;

acquiring release of the lock status for forming a first image;

acquire and authenticate a password, and after authenticating the password, storing a lock release file identifying a temporary replacement setting for the image formation configuration setting;

forming the first image on a printing sheet in accordance with information included in the lock release file; and deleting the lock release file after the first image is formed, and making the lock setting file effective for a subsequent image formation.

14. The recording medium according to claim 13, further storing instructions that, when executed, cause the step of creating the lock setting in accordance with externally input information.

15. The recording medium according to claim 14, wherein the step of authenticating the password includes comparing the password to an assigned password for identifying a user.

16. The recording medium according to claim 13, wherein the step of acquiring release of the lock status includes displaying, on a screen, a dialogue acquiring modification of an image configuration setting.

17. The recording medium according to claim 16, wherein the step of displaying displays the dialogue as a frontmost window on the screen.

18. A non-transitory computer-readable recording medium storing instructions which, when executed by a computer, cause the computer to perform the following:

acquiring release of a locked image formation configuration setting for the formation of an image;

authenticate a password;

after authenticating the password, creating a lock release file containing information identifying a replacement setting for the locked image formation configuration setting that is to be released;

forming the image on a printing sheet in accordance with an initial setting stored in a first storage and the information included in the lock release file; and in response to forming the image on the printing sheet, deleting the lock release file after the image formation, and making the lock setting effective for a subsequent image formation.

* * * * *